Patented June 1, 1954

2,680,137

UNITED STATES PATENT OFFICE 2,680,137

DIETHYLENE TRIAMINE CONDENSATE

Charles F. Pickett, Bel Air, and Myer Rosenfeld, Aberdeen, Md.

No Drawing. Application August 30, 1951, Serial No. 244,453

9 Claims. (Cl. 260—584)

(Granted under Title 35, U. S. Code (1952), sec. 266)

This application is a continuation-in-part of our co-pending application, Serial Number 67,083 filed December 23, 1948, now Patent No. 2,616,856, and relates to the condensation products of diethylene triamine and diacetone alcohol. We have found that such products are useful as detergents particularly when in a synergistic mixture with an oleate. It is accordingly the primary object of the invention to provide condensation products of diethylene triamine and diacetone alcohol suitable as ingredients for detergent compositions. Other objects of the invention will be evident hereinafter.

The two materials forming the basis of our invention are both well known chemicals of commerce and the commercially available products are entirely suitable for our purpose. Diethylene triamine, 2,2'-diaminodiethylamine, is a strongly alkaline, hygroscopic, somewhat viscous liquid with the formula $NH_2C_2H_4NHC_2H_4NH_2$, a boiling point of 207.1° C. and a specific gravity of 0.9542 at 20° C./20°. Commercial specifications tolerate a specific gravity of 0.953-0.958 at 20° C./20° C. and a boiling range of 185°-215° C. at 760 mm. pressure. This triamine is soluble in water and hydrocarbons and is used as a solvent for materials such as sulfur and resins and as a saponification agent for acids. Diacetone alcohol, 4-hydroxy-4-methyl-2-pentanone, is a colorless liquid with a boiling point of 166° C., a freezing point of −44° C., a specific gravity of 0.9406 at 20° C./20° and the formula

$(CH_3)_2COHCH_2COCH_3$.

Commercially a distillation range of 130-180° C. is accepted. It is miscible with alcohols, hydrocarbons, esters and water and is used in antifreeze mixtures, compression fluids and in metal cleaning compositions.

We have found that diethylene triamine reacts readily with diacetone alcohol in the proportions of one mole of the former with one, two or three moles of the latter to form a condensation product or series of such products of definite value as a detergent. When the diethylene triamine and diacetone alcohol are simply mixed in the above proportions at ambient temperature, the reaction mixture quickly becomes warm. The condensation is very rapid and, for the purposes of the invention, can be considered as complete after the mixture has been allowed to stand for at least one hour. If the initial mixture of reagents is heated to about 70° C., the reaction proceeds with the evolution of much heat, an indication that, as would be expected, increase in temperature has increased the reaction rate. When elevated temperatures are employed the precaution should be taken of adding one material to the other dropwise in a flask provided with a reflux condenser. In production, water cooled kettles or reaction vessels may be utilized.

As illustrative of procedures for preparing the condensation product of our invention, the following examples are given:

*Example 1.*—To 499 ml. (about 4 moles) of diacetone alcohol are added 216 ml. (about 2 moles) of diethylene triamine in about 25 ml. portions, shaking after each addition. The last four portions of diethylene triamine are added slowly to avoid a too vigorous reaction. The mixture as described contains an excess of the alcohol and may be used as prepared. Mixtures containing stoichiometric proportions or an excess of the triamine may also be reacted in the same manner as shown in this example. The order of adding the reactants to each other may be reversed, i. e. the diacetone alcohol may be added to the diethylene triamine, but this order affects the product as will be shown below. Regardless of the order of mixing the ingredients, the product formed will synergistically cooperate with the oleate of diethylene triamine, as explained in the above mentioned co-pending application, after standing one hour, several days or four weeks indicating that the cooperating condensate is formed to a considerable extent in the early stages of the reaction.

*Example 2.*—Either component in calculated quantity is slowly added at one time to the other at ambient temperature forming distinct layers of the components. In this and all the other calculations one molecular weight of diethylene triamine is taken as 107.6 ml. and one molecular weight of diacetone alcohol as 124.8 ml. Stirring is not used in this case, the reaction rate being controlled by interdiffusion. After a period of from four to sixteen hours the resultant mix is thoroughly stirred. The mix is ready for use in some applications in five hours but steadily improves for about sixteen. No more than one-half gallon is prepared in one batch to avoid excessive heat of reaction.

*Example 3.*—The desired molar quantity of one component is added dropwise to the calculated quantity of the other component at ambient temperature with vigorous stirring with an air stirrer or other spark-free stirrer. If the diethylene triamine is added to the diacetone alcohol, the rate of addition is two to three milliliters per minute per liter of diacetone alcohol. If the reverse addition order is used, the diacetone alcohol is added at the rate of 25-30 ml. per minute per liter of the diethylene triamine. After equal molar quantities have been added, very rapid addition of the remaining alcohol is possible. The temperature attained by the reacting mixes in either of these directions of addition does not usually exceed 50° C. The resulting solutions are ready for immediate use.

That some difference exists between the condensation products depending upon the order in which the reactants are added to each other is shown by the following tables in which DA represents diacetone alcohol and DT, diethylene triamine. The tables are based upon a series of experiments in which stoichiometric ratios of the reactants were added to each other according to the procedure outlined above. The molar ratios of the reactants are indicated by the numerals placed before the symbols for the reactants while the order of mixing is shown by the word "to." Thus "1 DA to 1 DT" means that one mole of diacetone alcohol was added to one mole of diethylene triamine, 1 DA being considered equivalent to 124.8 ml. diacetone alcohol. After completion of each reaction, that is after the mixture had been allowed to set for at least one hour, viscosities were taken at two different temperatures and the specific gravity of the original condensate obtained. The cooled condensate was then extracted with petroleum ether (P. E.) of a boiling point range extending from 30°-65° C. Both the petroleum ether soluble and insoluble fractions were evaporated at ambient temperature to constant weight by bubbling nitrogen through them. Viscosities and specific gravities were obtained for both fractions. Table 1 shows the number of the sample, the ingredients and the viscosities of all fractions at 77° M. Table II shows the number of the sample, the viscosities of all fractions at 130° F., and the specific gravities at 75° F.

*Table I*

| 1. Sample | 2. Mole Ratios | 3. Viscosity at 77° F. (Centistokes) | | |
|---|---|---|---|---|
| | | a. Original | b. P. E. Insoluble | c. Soluble |
| 1 | D. A. | 3.54 | | |
| 2 | D. T. | 6.40 | | |
| 3 | 1 DA to 1 DT | 179 | 134 | 215 |
| 4 | 1 DT to 1 DA | 167 | 135 | 193 |
| 5 | 1 DA to 2 DT | 57.6 | 71.6 | 52.3 |
| 6 | 2 DT to 1 DA | 54.2 | 63.0 | 60.0 |
| 7 | 1 DA to 3 DT | 26.5 | 59.9 | 225.0 |
| 8 | 3 DT to 1 DA | 25.4 | 48.9 | 55.1 |
| 9 | 2 DA to 1 DT | 25.2 | 182.7 | 406.9 |
| 10 | 1 DT to 2 DA | 27.2 | 165.8 | 252 |
| 11 | 3 DA to 1 DT | 6.20 | 172.8 | 539.4 |
| 12 | 1 DT to 3 DA | 6.35 | 148.1 | 300 |

*Table II*

| 1. Sample | 2. Viscosity at 130° F. (Centistokes) | | | 3. Specific Gravity at 75° F. | | |
|---|---|---|---|---|---|---|
| | a. Original | b. P. E. insoluble | c. P. E. soluble | a. Original | b. P. E. insoluble | c. P. E. soluble |
| 3 | 11.5 | 12.0 | 18.5 | 0.984 | 0.989 | 0.972 |
| 4 | 11.9 | 12.9 | 12.6 | .981 | .988 | .975 |
| 5 | 8.73 | 9.93 | 8.48 | .978 | .992 | .963 |
| 6 | 8.57 | 9.22 | 9.13 | .981 | .989 | .973 |
| 7 | 5.82 | 9.51 | 19.7 | .966 | .998 | .984 |
| 8 | 5.63 | 8.45 | 8.68 | .973 | .991 | .973 |
| 9 | 4.76 | 14.1 | 25.2 | .948 | .988 | .982 |
| 10 | 5.00 | 14.2 | 19.8 | .946 | .987 | .977 |
| 11 | 2.17 | 15.1 | 29.3 | .917 | .986 | .987 |
| 12 | 2.03 | 11.0 | 22.4 | .914 | .973 | .974 |

Sample 3 in the above tables was made by adding 124.8 ml., diacetone alcohol to 107.6 ml. diethylene triamine without stirring. After four hours the product was shaken thoroughly. Tests were made after not less than sixteen hours. Sample 4 was made in identical fashion but by addition of the diethylene triamine to the diacetone alcohol. Sample 5 was made like sample 3 but by addition of 124.8 ml. of diacetone alcohol to 215.2 ml. of diethylene triamine. All other samples were prepared similarly using the amounts and order of addition indicated by the symbolic representation of column 2, Table I.

The complexity of the reaction as well as the improbability of indicating a particular compound is readily recognized from the data. Other indications of this complexity exist. For example the colors vary from the yellow of diethylene triamine and the colorlessness of the diacetone alcohol through reddish brown, brown and dark brown in sample 12. All the condensates are useful as detergents, particularly when in synergistic relationship with the diethylene triamine oleate of the parent application. Some difference in effect can be seen, however, dependent upon the method of preparation of the condensate. If the triamine is added to the alcohol, the resultant condensate gives best results mixed with the oleate in a hydrocarbon solvent. On the other hand, the condensate formed by adding the alcohol to the triamine gives best results with water as a solvent. The condensates are soluble in water but are only soluble in oil in the presence of surfactants such as diglycol oleate, ethanol amine oleate and diethylene triamine oleate.

The obvious explanation of the condensation reaction is the splitting off of water by the union of the carbonyl oxygen of the diacetone alcohol with the hydrogens of one or both of the terminal amine groups of the diethylene triamine. The amount of diacetone alcohol introduced into the diethylene triamine molecule can be varied merely by changing the order in which the two reactants are added to each other. Consequently the reaction is not as straightforward as it appears on the surface. The hydroxyl group of the alcohol is perhaps rendered exceptionally active due to the presence of the adjacent carbonyl group and is replaceable by the nitrogen to some extent. Such nitrogen would be held loosely under these conditions and could be highly adsorbable on a metal surface. The adsorption energy would be very high and might be sufficient to cause bonding of the compound to a metal preferentially to soil bonding.

Because the methylene group of diacetone alcohol is attached to carbons which are attached to oxygens (carbonyl oxygen in one case, and hydroxyl oxygen in the other) it is believed that there is an enol-keto transformation:

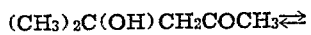

(1)

(2)

It is obvious that the reaction is not solely a Schiff's base type, because diacetone alcohol is reacted with triethylamine which contains no hydrogen bound to the nitrogen. The explanation is believed to lie in molecule (2) above. This molecule is thought to have a tertiary hydroxyl in which the bonding is sufficiently labile that the following can occur:

(CH$_3$)$_2$C(OH)CH=C(OH)CH$_3$ +
  NH$_2$CH$_2$CH$_2$NHCH$_2$CH$_2$NH$_2$ →
    NH$_2$CH$_2$CH$_2$NHCH$_2$CH$_2$N(H)$_2$
    (OH)C(CH$_3$)$_2$CH=C(OH)CH$_3$ (3)

Whether the nitrogen bonding is weakened due to a tertiary bonding, or only exists as a secondary linkage, is not known. However, it is believed that part of the cleansing ability of the molecule is derived from the energy of the molecular adsorption on the surface at the nitrogen. The condensate, in any case, has been found to be very efficient when used in conjunction with other surfactants.

Referring to (3), it can be seen that there are two unreacted amine groups present. If diethylene triamine is added to diacetone alcohol, many molecules of the diacetone alcohol are available for reacting with the diethylene triamine. There are three amine groups present in the triamine and each one of these can react with diacetone alcohol. One would also expect diamine derivatives to be present, as the reactive alcohol available becomes lessened with more extensive addition of the amine. Such diamines and triamines might take the form of (4) and (5) respectively.

NH[CH$_2$CH$_2$N(H)$_2$(OH)
    C(CH$_3$)$_2$CH=C(OH)CH$_3$]$_2$ (4)

CH$_3$C(OH)=CHC(CH$_3$)$_2$N(H)(OH)
    [CH$_2$CH$_2$N(H)$_2$(OH)C(CH$_3$)$_2$CH=C(OH)CH$_3$]$_2$ (5)

The reaction may also proceed to form Schiff's base intermediates, e. g. (6) or Schiff's base type compounds (7)

(CH$_3$)$_2$C(OH)CH$_2$CH(OH)
    NHCH$_2$CH$_2$NHCH$_2$CH$_2$NH$_2$ (6) mono-diacetone derivative (CH$_3$)$_2$C(OH)CH$_2$CH(OH)
    NHCH$_2$CH$_2$NHCH$_2$CH$_2$NHCH(OH)
        CH$_2$C(OH)(CH$_3$)$_2$ (6) di-diacetone derivative

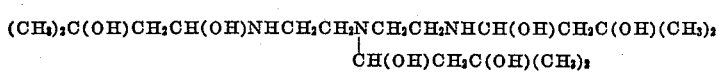

(6) tri-diacetone derivative (CH$_3$)$_2$C(OH)CH$_2$C(CH$_3$)=
    NCH$_2$CH$_2$NCH$_2$CH$_2$NH$_2$ (7) mono-diacetone derivative (CH$_3$)$_2$C(OH)CH$_2$C(CH$_3$)=
    NCH$_2$CH$_2$NHCH$_2$CH$_2$N=
        C(CH$_3$)CH$_2$C(OH)(CH$_3$)$_2$ (7) di-diacetone derivative Two molecules which have formed di-diacetone derivatives of (7) but in which the central amine has formed a Schiff's base intermediate (8) can react to form (9).

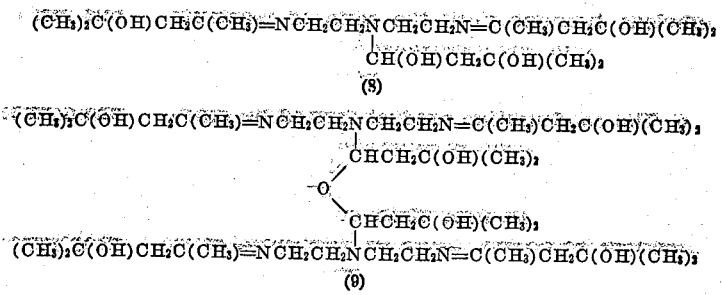

The important point stressed here is not the particular compounds formed, but the manner in which different types of compounds can be expected, depending on order of addition. To reiterate, if diethylene triamine is added to diacetone alcohol, one molecule of diethylene triamine initially encounters many molecules of diacetone alcohol, so that each of the amine groups can be reacted with diacetone alcohol. This situation will continue so long as the probability is in favor of a given molecule of diethylene triamine colliding with more than one unreacted diacetone alcohol. However, when diacetone alcohol is added to the diethylene triamine, regardless of mechanism of reaction, there are many diethylene triamine molecules present per molecule of diacetone alcohol. It is, therefore, much more probable for collision of successively added diacetone alcohol molecules to be with different amine molecules, than for successive diacetone alcohol molecules to hit the same diethylene triamine molecule. When most of the mono-amine derivatives have been formed, diamines can be formed. It is obvious, however, that only a minute amount of tri-amine derivatives could be expected, in a solution in which the mole ratio of diethylene triamine to diacetone alcohol is 1:1 or 1:2, and that the rate of even diamine formation would be quite slow compared to the previous direction of addition. The logic of this reasoning is borne out by the fact that much more heat is evolved in adding the amine to the diacetone alcohol than in the reverse manner of addition. Consequently, when the preparation is made with thorough stirring, it is safe to add 25–30 ml. per minute of diacetone alcohol per liter of diethylene triamine used; however, only 2 to 3 ml. per minute of diethylene triamine can be added per liter of diacetone alcohol to the diacetone alcohol, if it is desired to keep the reaction fom becoming unduly vigorous.

While in the foregoing paragraphs we have outlined a theoretical reaction scheme, we desire to be bound solely by the appended claims.

What we claim is:

1. The condensation product formed by admixing diethylene triamine and 4-hydroxy-4- methyl-2-pentanone in the ratio of one mole of the diethylene triamine to from one to three moles of diacetone alcohol.

2. The condensation product formed by adding diethylene triamine stepwise to 4-hydroxy-4-methyl-2-pentanone until the ratio of reactants is one mole of the diethylene triamine to from one to three moles of 4-hydroxy-4-methyl-2-pentanone.

3. The condensation product formed by 4-hydroxy-4-methyl-2-pentanone stepwise to diethylene triamine until the ratio of reactants is one mole of the diethylene triamine to from one to three moles of 4-hydroxy-4-methyl-2-pentanone.

4. The condensation product formed by gradually adding from one to three mols of 4-hydroxy-4-methyl-2-pentanone to one mol of diethylene triamine in distinct layers, permitting a condensation reaction to take place over a period of from four to sixteen hours by interdiffusion of the reactants and then thoroughly stirring the mix.

5. The reaction product obtained by reacting one mol of diethylene triamine and 3 mols of 4-hydroxy-4-methyl-2-pentanone.

6. The condensation product of diethylene triamine and 4-hydroxy-4-methyl-2-pentanone in the ratio of about one mole of diethylene triamine to from one to three mols of 4-hydroxy-4-methyl-2-pentanone.

7. The reaction product obtained by admixing one mol of diethylene triamine with three mols of 4-hydroxy-4-methyl-2-pentanone and thereafter permitting the reaction to proceed for a period of time from about one hour to four weeks.

8. The reaction product obtained by admixing one mol of diethylene triamine with three mols of 4-hydroxy-4-methyl-2-pentanone at ambient temperature and thereafter permitting the reaction to proceed for a period of time from about one hour to four weeks.

9. The process of producing a reaction product from diethylene triamine and 4-hydroxy-4-methyl-2-pentanone which comprises gradually bringing the reacting materials into admixture in proportions of one mole of diethylene triamine to three mols of 4-hydroxy-4-methyl-2-pentanone and thereafter interrupting the reaction within a period of time of about one hour to four weeks.

No references cited.